United States Patent [19]

Peterson et al.

[11] Patent Number: 4,843,901
[45] Date of Patent: Jul. 4, 1989

[54] ELECTRIC SHIFT APPARATUS WITH MANUAL OVERRIDE

[76] Inventors: David C. Peterson, 855 S. Pontiac Trail, #302, Walled Lake, Mich. 48088; Keith V. Leigh-Monstevens, 5622 Larkins Dr., Troy, Mich. 48098; John G. Vanderpoorte, 22476 St. Clair Dr., St. Clair Shores, Mich. 48081; Brian D. Mabee, 26340 Woodingham, Warren, Mich. 48091

[21] Appl. No.: 142,014

[22] Filed: Jan. 11, 1988

Related U.S. Application Data

[63] Continuation-in-part of Ser. No. 95,856, Sep. 14, 1987.

[51] Int. Cl.[4] .............................................. B60K 20/10
[52] U.S. Cl. ......................................... 74/335; 74/625
[58] Field of Search .................... 74/335, 483 PB, 625

[56] References Cited

U.S. PATENT DOCUMENTS

| | | | |
|---|---|---|---|
| 2,634,622 | 4/1953 | Cripe | 74/335 |
| 3,277,734 | 10/1966 | Bernard | 74/335 |
| 4,065,983 | 1/1978 | Mimura | 74/335 X |
| 4,291,586 | 9/1981 | Buetemeister | 74/335 |
| 4,339,962 | 1/1982 | Babel | 74/335 |
| 4,428,248 | 1/1984 | Broucksou et al. | 74/335 |
| 4,541,609 | 9/1985 | Smith | 74/625 X |
| 4,570,765 | 2/1986 | Makita | 74/335 X |
| 4,619,151 | 10/1986 | Trachman | 74/335 |
| 4,664,217 | 5/1987 | Welch et al. | 180/247 |

OTHER PUBLICATIONS

Pages 8B-8, 8B-9, 8B-10 and 8B-11 from the 1985 Pontiac Fiero Service Manual.

Primary Examiner—Dirk Wright
Attorney, Agent, or Firm—Krass & Young

[57] ABSTRACT

An electric shift apparatus for use with a motor vehicle having an automatic transmission. The apparatus includes a power module adapted to be mounted on the housing of the transmission proximate the transmission mode select shaft and a control module adapted to be mounted in the passenger compartment of the vehicle. The power module includes an electric motor driving a speed reduction unit and the lower exposed end of the output shaft of the speed reduction unit is adapted to be drivingly coupled to the exposed upper end of the mode select shaft of the automatic transmission. A manual override is provided so that, in the event of a total loss of vehicle electric power, the transmission may be moved manually to any desired position to facilitate emergency servicing of the vehicle. A pointer mounted on an exposed end of the output shaft of the speed reduction unit coacts with indicia provided on the housing of the speed reduction unit to provide a constant visual indication of the instantaneous position of the transmission to assist in the manual override function.

23 Claims, 5 Drawing Sheets

ELECTRIC SHIFT APPARATUS WITH MANUAL OVERRIDE

RELATED APPLICATION

This application is a continuation-in-part of U.S. patent application Ser. No. 095,856 filed Sept. 14, 1987 and still pending.

BACKGROUND OF THE INVENTION

This invention relates generally to an electric shift apparatus especially suited for use with a motor vehicle having an automatic transmission and, more particularly, to a manual override for such an electric shift apparatus.

Motor vehicles since their inception have required some manner of gear change mechanism to satisfy the varying torque and speed requirements encountered during the typical duty cycle of a motor vehicle. For many years these gear change mechanisms were manual in the sense that they required an operator input from a shift lever or the like to effect each desired gear change ratio. More recently, so-called "automatic" transmissions have become popular in which much of the shifting is done without operator input in response to sensed speed and throttle opening parameters. These automatic transmissions typically include a mode select member on the transmission housing movable between a plurality of selected positions corresponding to a respective plurality of shift modes within the transmission. The mode select member is moved between its several shift positions by a cable or linkage mechanism extending from the mode select member to a suitable gear selector lever located in the passenger compartment of the vehicle. Various proposals have been made in the past to eliminate the mechanical interconnection between the driver operated lever and the mode select member and provide instead an electric shift apparatus in which electrical signals generated by a suitable action on the part of the driver are transmitted electrically to some manner of power means arranged to move the mode select member.

In one such proposal disclosed in U.S. patent application Ser. No. 095,856, assigned to the assignee of the present invention, the electric shift apparatus includes an electric motor having a housing and an output shaft; a speed reduction unit having a housing secured to the motor housing and having an output shaft driven at a reduced speed in response to rotation of the motor output shaft and having a free end positioned outside of the speed reduction unit housing; means for mounting the motor and speed reduction unit on the transmission housing with the output shaft of the speed reduction unit aligned coaxially with the mode select shaft of the transmission and the free ends of the shafts juxtaposed; coacting coupling means on the free ends of the shafts operative to drive the mode select shaft in response to rotation of the reduction unit output shaft; and encoder means operative to sense the shift position of the transmission and generate an encoder signal representative of the sensed shift position. Whereas this arrangement provides a compact and efficient shift apparatus which functions in most situations to effectively drive the mode select shaft of the transmission between its various shift positions, there are certain emergency situations in which this arrangement is not totally satisfactory. Specifically, if a total electrical failure is encountered while driving the associated vehicle, the vehicle will stop with the transmission in its drive position. If an attempt is thereafter made to jump-start the vehicle, the attempt will be unsuccessful since the vehicle will only start with the transmission in its neutral position or its park position. Further, if the vehicle is parked in a confined space such as a garage with the transmission in the park position and the vehicle thereafter cannot be started due to a battery failure or the like, the vehicle is difficult to start or move since the confined space of the garage makes jumping difficult and the park disposition of the transmission makes towing impossible.

SUMMARY OF THE INVENTION

This invention is directed to the provision of an electric shift apparatus for an automatic transmission of a motor vehicle which provides positive and precise shifting of the transmission and which includes provision for manually shifting the transmission in the event of system failure.

The invention is intended for use with a motor vehicle of the type having an automatic transmission and wherein an electric shift apparatus is provided to selectively move the mode select member of the transmission between its several positions in response to selective energization of the electric motor of the electric shift apparatus. According to the invention, the electric shift apparatus includes manual override means which are operative to move the output shaft, and thereby the mode select member of the transmission, independently of energization of the motor. With this arrangement, the transmission may be manually moved to a desired position in emergency situations when electrical power is lost in the vehicle.

According to a further feature of the invention, the electric shift apparatus further includes a speed reduction unit driven by the motor and the manual override means includes means for rotating the speed reduction unit output shaft independently of the energization of the motor. This arrangement provides a ready and convenient means of moving the transmission to a desired shift position in situations where vehicle electrical power is lost.

In one embodiment of the invention, the manual override means includes means for manually rotating the motor output shaft so as to thereby rotate the output shaft of the speed reduction unit and thereby move the mode select member of the transmission. In this embodiment of the invention, one end of the armature shaft of the motor drivingly engages the speed reduction unit and the other end of the armature shaft of the motor is accessible from outside of the motor housing and includes means for engaging the armature shaft and rotating the shaft to rotate the output shaft of the speed reduction unit and thereby move the mode select member of the transmission.

In another embodiment of the invention one end of the output shaft of the speed reduction unit is adapted to engage the mode select member of the transmission and the other end of the speed reduction unit output shaft extends outside of the housing of the speed reduction unit and includes means for engaging the shaft so as to rotate the shaft and thereby selectively move the mode select member of the transmission.

In both embodiments of the invention, visual means are provided for tracking the annular position of the output shaft of the speed reduction unit and thereby provide a visual indication of the position of the mode select member of the transmission. The visual means includes a visual indicator carried on the end of the reduction unit output shaft remote from the mode select member coacting with indicia provided on the adjacent face of the housing of the speed reduction unit.

DETAILED DESCRIPTION OF THE PREFERRED EMBODIMENT

Figures 1, 2:
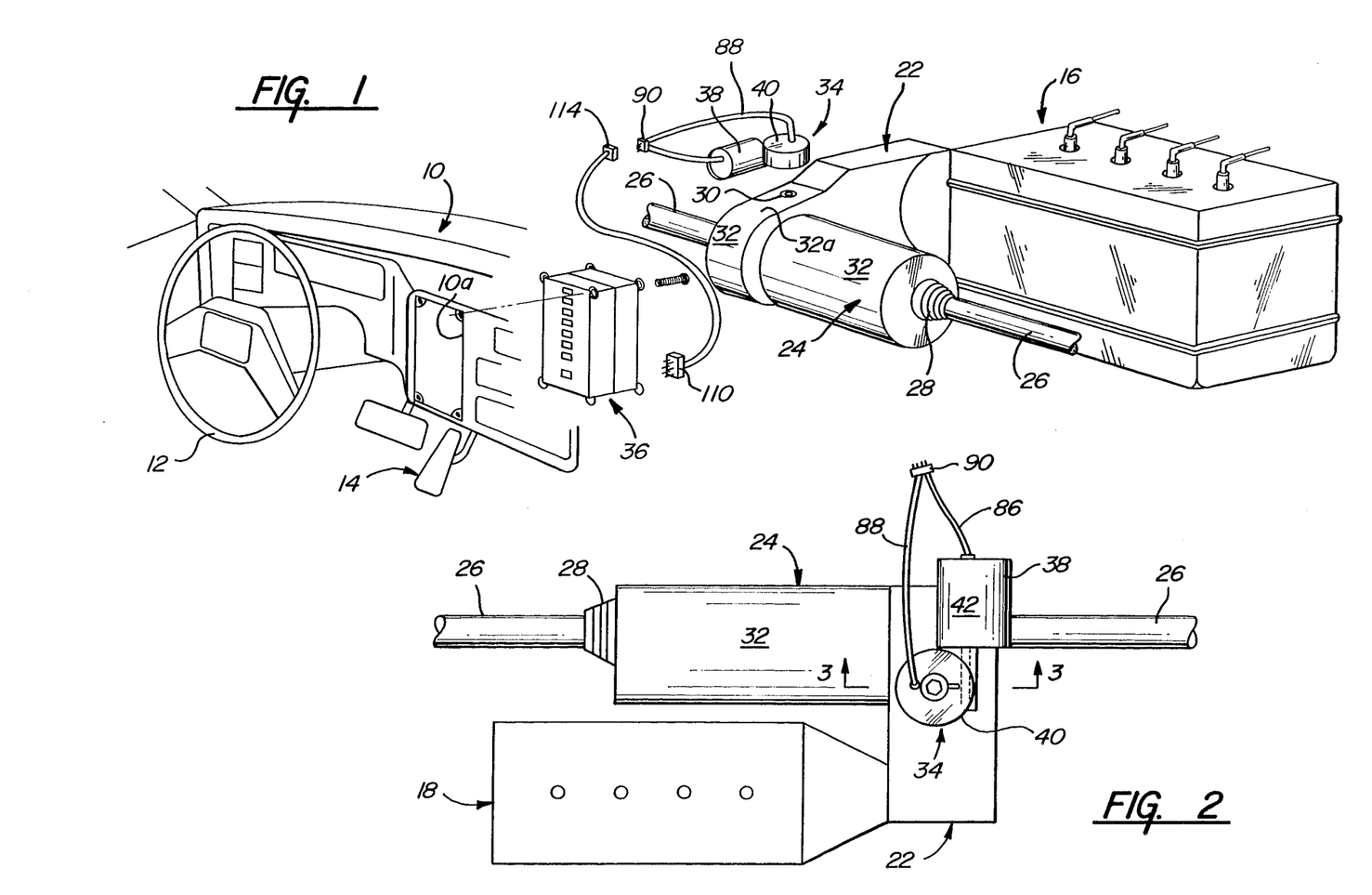
FIG. 1 is a fragmentary perspective view of a front wheel drive motor vehicle embodying the invention electric shift apparatus.
FIG. 2 is a fragmentary plan view of the front wheel drive assembly of the vehicle of FIG. 1.

The invention electric shift apparatus is seen schematically in FIG. 1 in association with a motor vehicle of the front wheel drive type and including an instrument panel assembly 10 positioned within the passenger compartment of the motor vehicle; a steering wheel 12 associated with the instrument panel; an accelerator pedal assembly 14; and a front wheel drive assembly 16.

Front wheel drive assembly 16 includes an internal combustion engine 18 mounted transversely in the engine compartment of the vehicle, a torque converter 20 driven by engine 18, a gear drive assembly 22, an automatic transmission 24, and drive shafts 26 drivingly connected to the opposite ends of transmission 24 by U joints 28. Transmission 24 includes a mode select shaft 30 having a hollow upper end 30a positioned generally flush with the upper surface 32a of the housing 32 of the transmission 24 and operable in known manner in response to rotation of the shaft to operate internal devices within the transmission to position the transmission in a plurality of transmission modes such as park, neutral, drive, etc.

The invention electric shift apparatus, broadly considered, comprises a power module 34 and a control module 36.

Power module 34 is adapted to be bolted to transmission housing 32 in proximity to mode select shaft 30 and control module 36 is adapted to be positioned in the instrument panel assembly 10 of the vehicle for convenient operator access.

Power module 34 is in the form of a motor assembly and includes a DC electric motor 38 and a speed reduction unit 40.

Figures 3, 4, 4A:
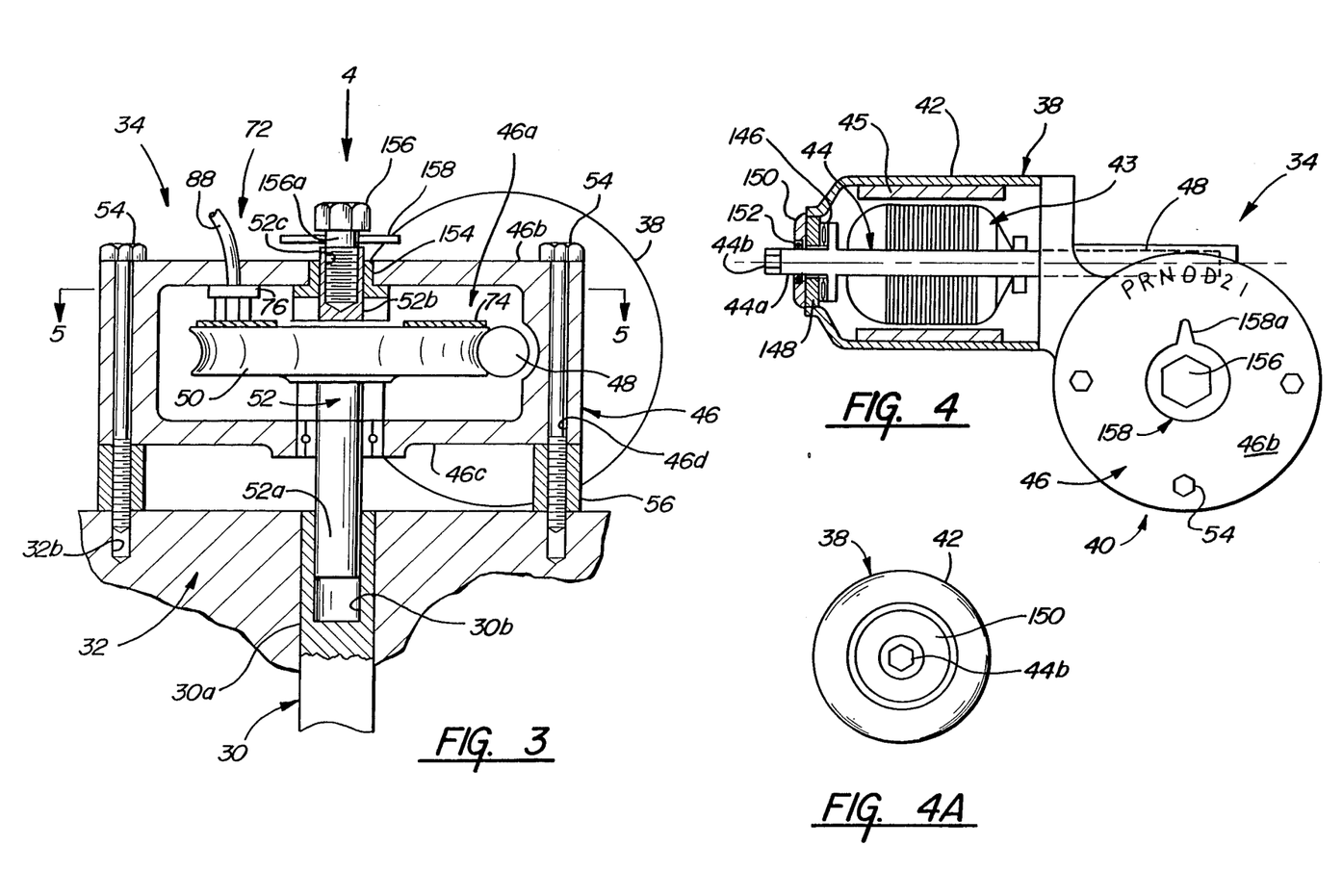
FIG. 3 is a cross sectional view of the invention electric shift apparatus taken on line 3—3 of FIG. 2.
FIG. 4 is a view looking in the direction of the arrow 4 in FIG. 3.
FIG. 4A is an end view of the armature shaft of the electric motor of the invention electric shift apparatus.

Motor 38 is a direct current permanent magnet motor having, for example, an output torque rating of 200 inch pounds and includes a housing 42, an armature 43, an armature shaft 44, and permanent magnets 45.

Speed reduction unit 40 includes a generally circular housing 46 fixedly secured to motor housing 42 and defining an internal cavity 46a between axially spaced side walls 46b and 46c; a worm gear 48 formed as a coaxial forward extension of motor armature shaft 44 and extending into cavity 46a; a worm wheel 50 positioned in cavity 46a and driven by worm gear 48; and an output shaft 52 driven by worm wheel 50, journalled in housing walls 46b and 46c, and including a free lower end 52a positioned outside of and below housing wall 46c. Shaft lower end 52a is D shaped in cross section for driving coupling receipt in a D-shaped opening 30b in the upper end 30a of mode select shaft 30.

Power module 34 is mounted on the upper face 32a of transmission housing 32 by a plurality of bolts 54 passing downwardly through bores 46c in housing 46 and downwardly through spacers 56 for threaded receipt in tapped bores 32b in transmission housing 32. In assembled relation, reduction unit output shaft 52 is coaxially aligned with mode select shaft 30, and shaft D section 52a is telescopically received in D-shaped opening 30b of mode select lever 30 so that actuation of motor 38 acts through worm shaft 48, worm wheel 50, and reduction unit shaft 52 to drive mode select shaft 30.

Power module 34 further includes an encoder assembly 72 operative to sense the instantaneous shift position of the transmission and generate an encoded signal representative of the sensed shift position.

Figures 5, 6, 7:
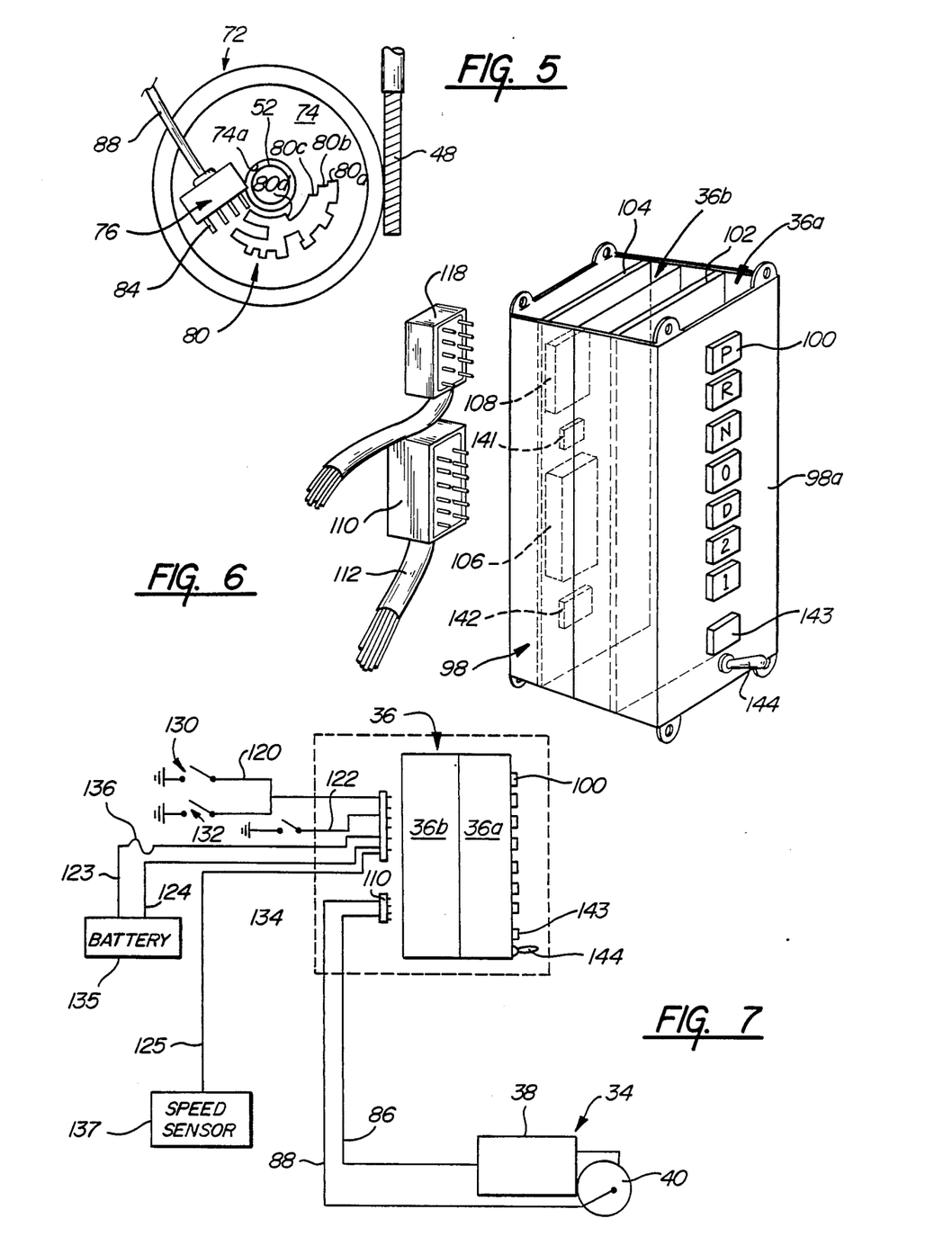
FIG. 5 is a fragmentary cross sectional view taken on line 5—5 of FIG. 3.
FIG. 6 is a fragmentary perspective view of a control module employed in the invention electric shift apparatus.
FIG. 7 is a circuit diagram for the invention electric shift apparatus.

Encoder assembly 72 includes an encoder wheel 74 and a pickup device 76. Encoder wheel 74 may be formed for example of a suitable plastic material and is secured to a side face of worm wheel 50 within reduction unit housing chamber 46a. Encoder wheel 74 includes a central aperture 74a passing speed reduction unit output shaft 52 and further includes code indicia 80 provided on the exposed outer face of the wheel and arranged along four arcuate tracks 80a, 80b, 80c and 80d centered on the center line of the encoder wheel.

Pickup device 76 includes a plastic body member 82 mounting a plurality of flexible resilient contact fingers 84 for respective coaction with indicia tracks 80a, 80b, 80c and 80d. In addition to the four fingers 84 for respective engagement with the four indicia tracks, a fifth finger is provided to provide a ground for the system.

A lead 86 from motor 42 and a lead 88 from pickup device 76 are combined into a pin-type plug 90.

Control module 36 is intended for ready installation in an opening 10a in instrument panel 10 by insertion of the module from the rear of the panel and fastening of the module within opening 10a by the use of several fasteners such as seen at 96. Module 36 includes a housing structure 98 of general box-like configuration enclosing an operator access or push button submodule 36a and a logic submodule 36b.

Push button submodule 30a includes a plurality of push buttons 100 positioned in vertically spaced relation in the front face 98a of the module housing and corresponding to the available transmission shift modes. Specifically, buttons 100 include buttons corresponding to park, reverse, neutral, over-drive, drive, second and first shift positions for the transmission. Buttons 100 coact in known manner with a printed circuit board 102 to generate suitable electrical signals in response to respective depression of the buttons 100.

Logic submodule 36b includes an electronic printed circuit board 104 suitably electrically connected to printed circuit 102 and suitably mounting a first plurality of connector terminals 106 and a second plurality of connector terminals 108. Connector terminals 106 coact with a pin-type plug 110 at the end of a cable 112. Cable 112 includes a plug 114 at its remote end for plugging receipt of plug 90 so that plug 110 embodies the information from leads 86 and 88. Connector terminals 108 coact with a pin-type plug 118. Plug 118 embodies the information from leads 120, 121, 122, 123, 124, and 125.

Lead 120 is associated with a switch 130 sensing the open or closed position of the driver's door of the vehicle; lead 121 is associated with a switch 132 sensing the presence or absence of a driver on the driver's seat of the vehicle; lead 122 senses the open or closed condition of the ignition switch 134 of the vehicle; leads 123 and 124 are connected to the negative and positive terminals of the vehicle battery 135 with a suitable fuse 136 in lead 123; and lead 125 is connected to a speed sensor 137 which provides information with respect to the instantaneous speed which the vehicle is traveling.

The invention electric shift assembly is delivered to the vehicle manufacturer in the form of power module 34 and control module 36. During the assembly of the vehicle, the power module 34 is mounted on the transmission housing 32 in coupling relation to mode select shaft 30 and the control module 36 is mounted in the instrument panel 10, whereafter plug 90 is plugged into plug 114 and plugs 110 and 118 are plugged into control module 36 to complete the assembly of the invention electric shift apparatus.

The mounting of power module 34 on the transmission housing is accomplished simply by positioning the lower end 52a of reduction shaft 52 in the upper end 30a of mode select shaft 30 and passing bolts 54 downwardly through bores 46d and spacers 56 for threaded engagement with tapped bores 32b in transmission housing 32.

Installation of control module 36 in instrument panel 10 is accomplished simply by moving the control module from the rear of the panel into the opening 10a and fastening the module in place by the use of fasteners 96 or the like. Following the plugging of plug 90 into plug 114 and the plugging of plugs 110 and 118 into connector terminals 106 and 108, the system is operational and ready for use.

In use, various input signals, such as described above and illustrated in FIG. 7, are supplied to a logic chip 141, which may be a programmable logic array or a gate array. Logic chip 141 is configured to receive these input signals and generate the necessary drive signals to motor 38 via a buffer 142 for providing the selection of the desired gear. Firstly, the various input signals are formed into a set of logic signals. These logic signals include a set of signals whose state is selected by the depressed push button 100; PARK, RVRS, NTRL, OVDR, DRVE, LOW1 and LOW2. One of these signals, corresponding to the desired gear selected by the depressed push button is a logic "1" while the other of these signals is a logic "0". Similarly, the encoder signal from encoder assembly 72 permits generation of a set of logic signals PGP, PGR, PGN, PGO, PGD, PGL1 and PGL2, one of which is active to indicate the present gear and the others of which are inactive. The speed sensor input signal is formed into four logic signals: MPH3 indicating a speed of greater than or equal to 3 miles per hour; MPH7 indicating a speed of greater than or equal to 7 miles per hour; MPH20 indicating a speed of greater than or equal to 20 miles per hour; and MPH30 indicating a speed of greater than or equal to 30 miles per hour. Each of these signals is active if their condition is satisfied and inactive if not. Note that these signals are cumulative; if the speed is over 30 miles per hour then all will be active. Additional logic signals include DOOR indicating the opened/closed status of the driver's door, SEAT indicating whether or not the driver's seat is occupied, IGN indicating the status of the ignition switch, and ACC indicating whether or not the accelerator switch 138 is closed.

Logic chip 141 serves to compare the inputs indicating the depressed push button with the inputs indicating the present gear. If they differ, then logic chip 141 generates an output signal to motor 38 to rotate the motor until the present gear matches the selected gear.

As soon as the instantaneous encoder signal transmitted by pickup device 76 matches the signal generated by the specific depressed push button, the comparator logic of control module 36 functions to deenergize and brake the motor so that the mode select shaft 30, and thereby the transmission, is stopped precisely in the selected shift position. Further details of the mathematical manner in which logic chip 141 functions to process the received signals are disclosed in U.S. patent application Ser. No. 095,856, assigned to the assignee of the present invention.

The invention system also preferably includes illumination means for the push buttons 100 with the intensity of the illumination controlled by the usual dash dimmer and with the button corresponding to the selected gear being illuminated brighter than the remaining buttons to provide a ready indication of the instantaneous position of the transmission. An override push button 143 is also provided as a part of push button submodule 36a. Override push button 143 allows the selection of the neutral shift position when it is necessary for the seat to be empty and the vehicle to be in neutral, for example, during vehicle tune-up, vehicle car wash, et cetera.

The system also preferably includes a limp home switch 144 as part of the push button submodule 36a. Limp home switch 144 is arranged to manually jog motor 38 in the event of a system malfunction to enable the vehicle to be driven home or to a repair facility.

The invention electric shift apparatus further includes means for manually overriding the system in the event of an electrical failure in the associated vehicle. Specifically, as seen in FIG. 4, motor armature shaft 44 is extended rearwardly through a thrust washer 146, a bushing 148, an end cap 150, and a seal 152 to present a shaft portion 44a positioned rearwardly and exteriorally of motor housing 42. Shaft portion 44a is provided with a hex cross sectional configuration 44b, as seen in FIG. 4a, so that a suitable wrench or other tool may be applied to hex 44b to selectively turn armature shaft 44. As armature shaft 44 is turned, worm shaft 48 turns to rotate worm wheel 50 and speed reduction unit shaft 52 and thereby selectively rotate mode select shaft 30 to move the transmission into a desired transmission position. The upper end 52a of speed reduction unit shaft 52, as viewed in FIG. 3, is journalled in a bushing 154 in reduction unit sidewall 46b and includes a hollow threaded central bore 52c threadably receiving a bolt 156. A pointer 158 is keyed on a shoulder portion 156a of bolt 156 and indicia PRNOD21 are embossed on the outer surface of speed reduction unit sidewall 46b for coaction with the point 158a of pointer 158. Thus, as hex 44b is manually rotated, pointer 158 coacts with indicia PRNOD21 to indicate the instantaneous position of the mode select shaft 30 and thereby the instantaneous position of the transmission.

Figure 8:
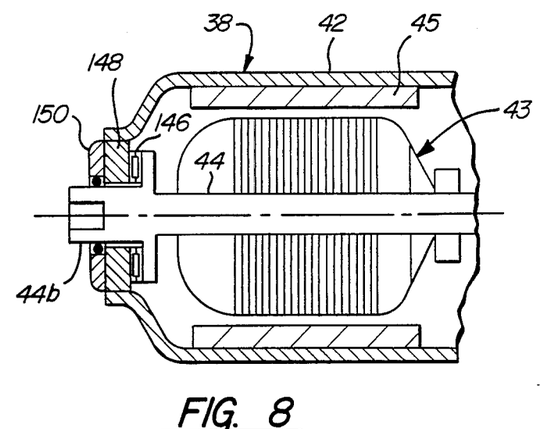
FIG. 8 is a fragmentary cross sectional view of a modified form of power module for use in the invention electric shift apparatus.
Figure 8A:
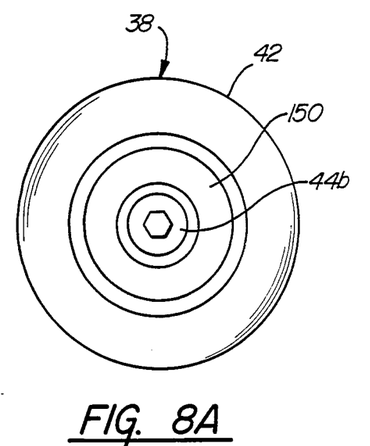
FIG. 8A is an end view of the armature shaft of the electric motor of the electric shift apparatus of FIG. 8.

The modified form of power module seen in FIG. 8 is identical to the power module of FIGS. 3 and 4 with the exception that the rearward extension 44a of the armature shaft includes a hex opening 44c, as seen in FIG. 8a, for plugging receipt of a suitable hex driver tool.

Figures 9, 11:
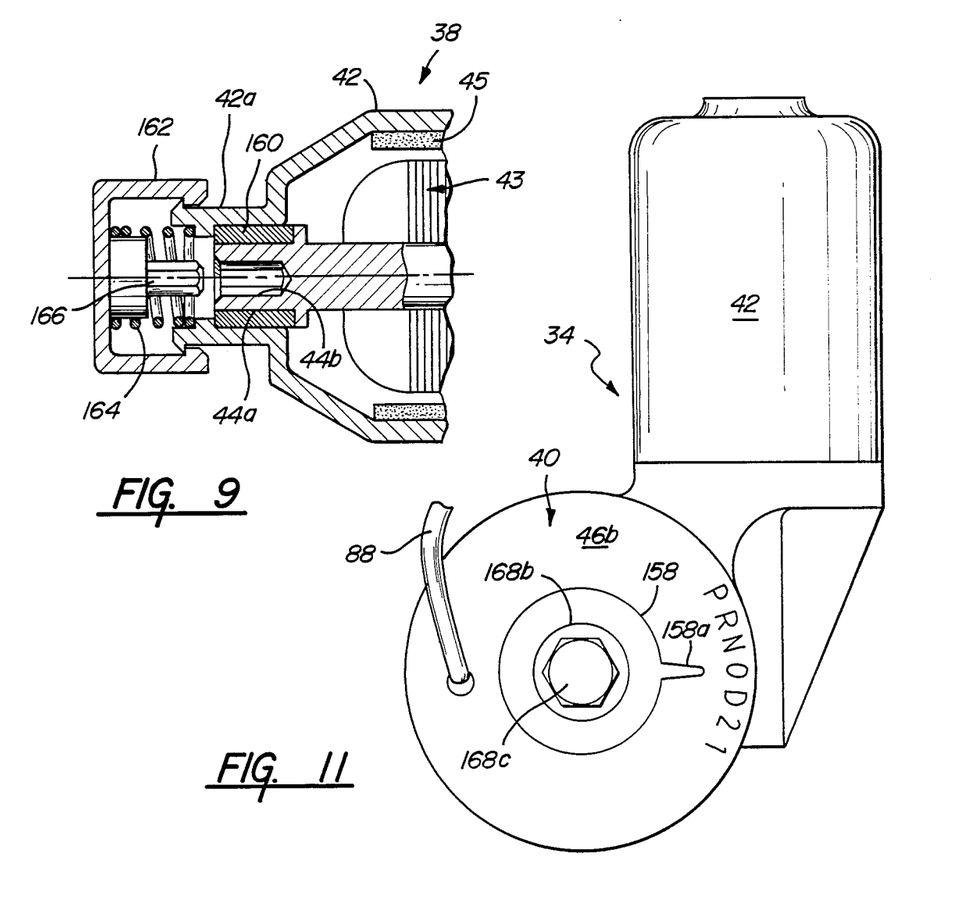
FIG. 9 is a fragmentary cross sectional view of a further modified form of power module for use in the invention electric shift apparatus.
FIG. 11 is a view looking in the direction of the arrow 11 in FIG. 10.

In the modified form of power module seen in FIG. 9, the rearward extension 44a of armature shaft 44 is journalled in a bushing 160 and includes a hex opening 44b; a knob 162 is slidably mounted on a rearward annual extension 42a of motor housing 42 and is biased to its rearwardly disposed inactive position by a coil spring 164; and a central hex driver member 166 is provided on knob 162 for coaction with hex opening 44b. In the operation of the FIG. 9 embodiment, knob 162 is normally maintained in its inactive or static position by spring 164. When it is desired to manually override th electric shift apparatus in the event for example, of electrical power failure in the associated vehicle, knob 162 is pushed inwardly or forwardly against the bias of spring 164 to engage hex driver 166 in hex opening 44b, whereafter knob 62 is turned, either by the fingers of the operator or by the use of a suitable tool, to selectively turn armature shaft 44 and thereby, in the manner previously described, selectively rotate mode select shaft 30 to selectively move the transmission to the desired position. Once the transmission has been positioned in the desired position, as indicated by coaction of pointer 158 with indicia PRNOD21 on the sidewall 46b of the speed reduction unit, knob 162 is released and is returned to its inactive or static position by the expanding movement of coil spring 164.

Figure 10:
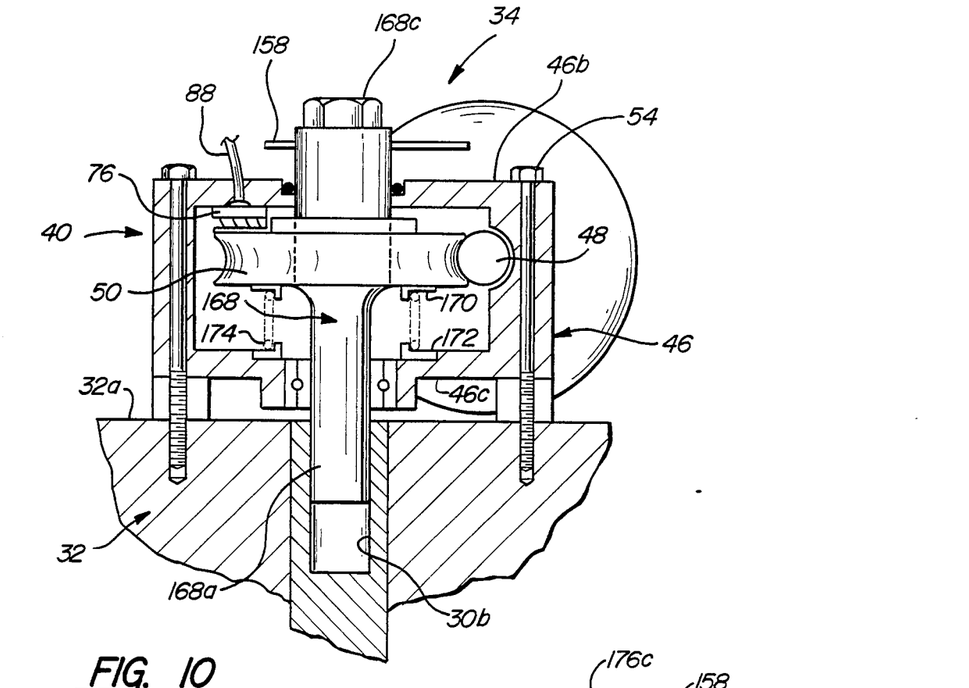
FIG. 10 is a cross sectional view of a further modified form of power module for use in the invention electric shift apparatus.

In the modified form of a power module seen in FIGS. 10 and 11, the manual override of the shift apparatus is accomplished by turning the shaft of the speed reduction unit rather than turning the armature shaft of the motor. Specifically, the output shaft 168 of the speed reduction unit 40 includes a lower D-shaped portion 168a received in mode select lever opening 30b and includes an enlarged portion 168b at its upper end passing through a suitable opening in speed reduction unit sidewall 46b and terminating in a hex head 168c. Pointer 158 is keyed to enlarged upper shaft portion 168b and, as in the previous embodiments, coacts with indicia PRNOD21 on the upper face of reduction unit sidewall 46b to indicate the instantaneous position of the transmission. An annular spring retainer 170 is secured to the lower face of worm wheel 50, another annular spring retainer 172 is secured to housing wall 46c, and a coil spring 174 is positioned between retainers 170 and 172 in surrounding relation to output shaft 168.

In the operation of the manual override of FIGS. 10 and 11, a suitable wrench is applied to hex 168c and downward pressure is applied to move the shaft 168 downwardly to disengage worm wheel 50 from worm shaft 48, whereafter shaft 168 is turned to move mode select shaft 30 to the desired position as indicated by the coaction of pointer 158 within indicia PRNOD21. Once the desired position has been achieved, downward pressure on the shaft 168 is released and the shaft is moved upwardly by spring 174 to a position in which worm wheel 50 reengages worm shaft 48.

Figure 12:
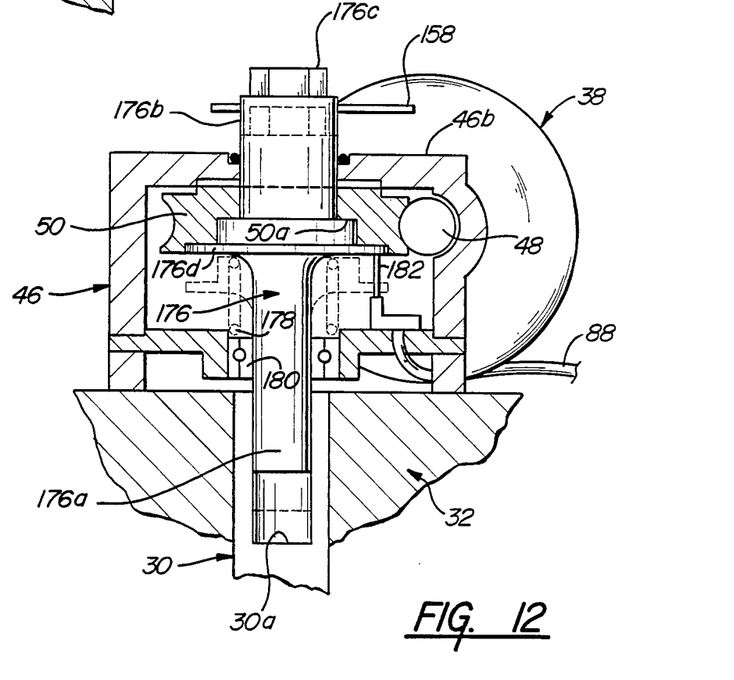
FIG. 12 is a cross sectional view of a further modified form of power module for use in the invention electric shift apparatus.

In the modified form of power module seen in FIG. 12, speed reduction unit shaft 176 includes a lower end D-shaped portion 176a received in the opening 30a of mode select shaft 30; the upper end of shaft 176 defines an enlarged portion 176b passing upwardly through housing sidewall 46b and terminating in a hex head 176c; pointer 158 is keyed to enlarged shaft portion 176b; and shaft 176 further includes a annular driver portion 176d received in an annular pocket or seat 50a defined on the lower face of worm wheel 50. A spring 178 is positioned between bearing 180 and the lower face of shaft driver portion 176d and encoder assembly 72 is modified and consists of a plurality of spring loaded contact fingers 182 engaging indicia 80a, 80b, 80c and 80d provided on the lower face of shaft driver portion 176d to provide, in the manner previously described, an encoded signal indicative of the instantaneous position of the transmission.

In the operation of the manual override of the FIG. 12 embodiment, the wrench or other tool is applied to hex head 176c and downward pressure is applied. Shaft 176 moves downwardly in response to this downward pressure but worm wheel 50 remains engaged with worm shaft 48 so that shaft driver portion 176d moves downwardly and axially away from worm wheel seat 50a. As soon as shaft driver portion 176d has moved downwardly to a position clear of worm wheel 50, shaft 176 is turned to move the mode select shaft 30 to the desired transmission position as indicated by the coaction of pointer 158 with the indicia PRNOD21 on the upper face of reduction unit sidewall 46d. As soon as the desired transmission position has been achieved, downward pressure on shaft 176 is released and the shaft is moved upwardly by spring 174 to reposition shaft driver portion 176d in worm wheel seat 50a and reestablish driving connection between shaft 176 and worm wheel 50. It will be understood that a suitable splined or keyed connection is provided between shaft driver portion 176d and worm wheel 50 so that the worm wheel may ordinarily drive the shaft but the shaft may move downwardly out of driving engagement with the worm wheel in order to accomplish the manual override function.

The invention electric shift apparatus will be seen to have many advantages. Specifically, the two modular assemblies minimize components and inventory requirements; the ease of assembly of the modules minimizes assembly plant labor; the power and control modules may both be pretested prior to delivery to the vehicle manufacturer with consequent improvements in reliability and warranty costs; noise and vibration from the power train to the passenger compartment is substantially minimized; the awkward intruding gear shift lever is eliminated in favor of attractive flush mounted pushbuttons in the instrument panel of the vehicle; and many important safety and convenience features are provided. Further, the manual override feature of the invention electric shift apparatus ensures that the operator of the associated vehicle will not be stranded in situations where the vehicle suffers a total loss of electric power but rather will be provided with a means to quickly and manually move the transmission to any desired shift position to facilitate the emergency surfacing of the vehicle. For example, if the vehicle suffers a loss of total vehicle electric power with the transmission in a drive position, the manual override means may be utilized to move the transmission to a park or neutral position to enable the vehicle to be started with the aid of jumper cables. Further, if the vehicle has been parked in the garage and fails to start in the morning, the manual override means may be used to move the transmission to a neutral position to enable the vehicle to be towed out of the garage and to a service facility or at least to a location where access can be had to the vehicle with jumper cables.

Whereas preferred embodiments of the invention have been illustrated and described in detail it will be apparent that various changes have been made in the disclosed embodiments not departing from the scope or spirit of the invention.

We claim:

1. An electric shift apparatus for use with a motor vehicle having an automatic transmission of the type including a mode select member, said apparatus comprising:
   (A) a housing
   (B) a motor assembly positioned within said housing and including an electric motor and a drive shaft assembly rotated in response to energization of said motor and including an output shaft having an output end accessible from outside of said housing;
   (C) means for mounting said motor assembly on the transmission housing in proximity to the mode select member;
   (D) drive means on said output end of said output shaft for drivingly connecting said output shaft to the mode select member so that the mode select member is moved in response to energization of said motor; and
   (E) manual override means, including an override end of said drive shaft assembly remote from said output end of said output shaft and extending to a location outboard of said housing and including means to facilitate engagement of said override end by a suitable tool, operative in response to engagement of said override end to move said output shaft, and thereby the mode select member, independently of energization of said motor.

2. An apparatus according to claim 1 wherein:
   (F) said motor assembly further includes a speed reduction unit driven by said motor;
   (G) said output shaft comprises the output shaft of said speed reduction unit; and
   (H) said manual override means is operative to rotate said speed reduction unit output shaft independently of the energization of said motor.

3. An apparatus according to claim 2 wherein:
   (I) said drive shaft assembly includes a motor output shaft drivingly connected to said speed reduction unit; and
   (J) said manual override means includes means for manually rotating said motor output shaft and thereby rotating said speed reduction unit output shaft.

4. An apparatus according to claim 3 wherein:
   (K) said motor includes a central armature shaft mounted for rotation in said housing;
   (L) one end of said armature shaft comprises said motor output shaft; and
   (M) the other end of said armature shaft is accessible from outside of said housing and comprises said override end.

5. An apparatus according to claim 2 wherein:
   (I) said speed reduction unit includes a reduction unit shaft assembly mounted for rotation in said housing;
   (J) one end of said reduction unit shaft assembly projects out of said housing and constitutes said output end of said output shaft; and
   (K) the other end of said reduction unit shaft assembly is accessible from outside of said housing and constitutes said override end.

6. An apparatus according to claim 5 wherein:
   (L) said reduction unit shaft assembly further includes a worm wheel mounted for rotation within said housing; and
   (M) said motor includes a worm gear output shaft drivingly engaging said worm wheel.

7. An apparatus according to claim 6 wherein:
   (N) said apparatus further includes encoder means operative to sense the shift position of the transmission and generate an encoder signal representative of the sensed shift position.

8. An apparatus according to claim 6 wherein:
   (N) said reduction unit shaft assembly is mounted for axial movement in said housing; and
   (O) said manual override means is further operative to move said reduction unit shaft assembly axially.

9. An electric shift apparatus for use with a motor vehicle having an automatic transmission of the type including a mode select shaft having a free end accessible from outside of the transmission housing, said apparatus comprising:
   (A) an electric motor having a housing and an output shaft rotated in response to energization of said motor;
   (B) a speed reduction unit having a housing secured to said motor housing and having an output shaft driven at a reduced speed in response to rotation of said motor output shaft and having a free end positioned outside of said speed reduction unit housing;
   (C) means for mounting said motor and speed reduction unit on the transmission housing with said reduction unit output shaft coaxially aligned with the mode select shaft and the free ends of said shafts juxtaposed;
   (D) coacting coupling means on the free ends of said shafts operative to drive the mode select shaft in response to rotation of said reduction unit output shaft;
   (E) manual override means operative to move said speed reduction unit output shaft, and thereby the mode select shaft, independently of energization of said motor; and
   (F) visual means tracking the angular position of said reduction unit output shaft and operative to provide a visual indication of the position of the mode select shaft.

10. An apparatus according to claim 9 wherein:
    (G) said visual means comprises a pointer mounted for rotary movement with said reduction unit output shaft coacting with indicia provided on said reduction unit housing.

11. An apparatus according to claim 10 wherein:
    (H) said speed reduction unit housing includes spaced side walls defining a central chamber;

(I) said reduction unit includes a central shaft mounted for rotation inside said speed reduction unit housing and extending between said spaced housing side walls;

(J) one end of said central shaft projects out of one of said side walls and constitutes said speed reduction unit output shaft;

(K) the other end of said central shaft projects out of the other of said side walls;

(L) said pointer is secured to said other end of said central shaft outside of said speed reduction unit housing; and (M) said indicia are provided proximate said other speed reduction unit housing side wall.

12. An apparatus according to claim 11 wherein:

(N) said motor includes a central armature shaft mounted for rotation in said motor housing;

(O) one end of said armature shaft comprises said motor output shaft;

(P) the other end of said armature shaft is accessible from outside of said motor housing; and (Q) said manual override means includes means on said other end of said armature shaft for manually rotating said armature shaft.

13. An apparatus according to claim 11 wherein said manual override means includes means on said other end of said central shaft for manually rotating said central shaft.

14. An apparatus according to claim 13 wherein:

(O) said central shaft is mounted for axial movement relative to said speed reduction unit housing; and (P) said speed reduction unit further includes a worm wheel mounted on said shaft and drivingly engaging said motor output shaft.

15. an apparatus according to claim 14 wherein:

(Q) said worm wheel is fixed to said central shaft and moves into and out of driving engagement with said motor output shaft in response to axial movement of said central shaft.

16. An apparatus according to claim 14 wherein:

(Q) said worm wheel is slidably mounted on said central shaft and remains in driving engagement with said motor output shaft in response to axial movement of said central shaft.

17. An electric shift apparatus for use with a motor vehicle having an automatic transmission of the type including a mode select member, said apparatus comprising:

(A) a motor assembly including an electric motor including a worm gear output shaft and a speed reduction unit including a housing and a central shaft assembly mounted for rotation in said housing and including an output shaft at one end of said shaft assembly projecting out of said housing and a worm wheel mounted for rotation in said housing and drivingly engaging said worm gear, the other end of said shaft assembly being accessible from outside of said housing;

(B) means for mounting said motor assembly on the transmission housing in proximity to the mode select member;

(C) means for drivingly connecting said reduction unit output shaft to the mode select member so that the mode select member is moved in response to energization of said motor; and (D) manual override means operative to move said reduction unit output shaft and thereby the mode select member independently of energization of said motor and including means on said other end of said central shaft assembly for manually rotating said central shaft assembly; and (E) encoder means, including encoding indicia provided on one face of said worm wheel, operative to sense the shift position of the transmission and generate an encoder signal representative of the sensed shift position.

18. An electric shift apparatus for use with a motor vehicle having an automatic transmission of the type including a mode select member, said apparatus comprising:

(A) a motor assembly including an electric motor and an output shaft rotated in response to energization of said motor;

(B) means for mounting said motor assembly on the transmission housing in proximity to the mode select member;

(C) means for drivingly connecting said output shaft to the mode select member so that the mode select member is moved in response to energization of said motor;

(D) manual override means operative to move said output shaft, and thereby the mode select member, independently of energization of said motor; and (E) visual means tracking the angular position of said output shaft and operative to provide a visual indication of the position of the mode select member.

19. An apparatus according to claim 18 wherein:

(F) said apparatus includes a housing; and (G) said visual means includes a visual indicator keyed to said output shaft and positioned outside of said housing.

20. An apparatus according to claim 19 wherein:

(H) said apparatus further includes indicia on said housing coacting with said visual indicator to provide a visual indication of the position of the mode select member.

21. An electric shift apparatus for use with a motor vehicle having an automatic transmission of the type including a mode select member, said apparatus comprising:

(A) a motor assembly including an electric motor including a worm gear output shaft and a speed reduction unit including a housing and a central shaft assembly mounted for rotation in said housing and including an output shaft at one end of said shaft assembly projecting out of said housing and a worm wheel mounted for rotation in said housing and drivingly engaging said worm gear, the other end of said shaft assembly being accessible from outside of said housing;

(B) means for mounting said motor assembly on the transmission housing in proximity to the mode select member;

(C) means for drivingly connecting said reduction unit output shaft to the mode select member so that the mode select member is moved in response to energization of said motor;

(D) said reduction unit shaft assembly being mounted for axially movement in said housing;

(E) said manual override means being further operative to move said reduction shaft assembly axially; and (F) said worm wheel being fixed to said central shaft assembly and moving into and out of driving engagement with said motor output shaft in response to axial movement of said reduction unit shaft assembly by said manual override means.

22. An electric shift apparatus for use with a motor vehicle having an automatic transmission of the type including a mode select member, said apparatus comprising:
(A) a motor assembly including an electric motor including a worm gear output shaft and a speed reduction unit including a housing and a central shaft assembly mounted for rotation in said housing and including an output shaft at one end of said shaft assembly projecting out of said housing and a worm wheel mounted for rotation in said housing and drivingly engaging said worm gear, the other end of said shaft assembly being accessible from outside of said housing;
(B) means for mounting said motor assembly on the transmission housing in proximity to the mode select member;
(C) means for drivingly connecting said reduction unit output shaft to the mode select member so that the mode select member is moved in response to energization of said motor;
(D) said reduction unit shaft assembly being mounted for axial movement in said housing;
(E) said manual override means being further operative to move said reduction shaft assembly axially; and
(F) said worm wheel being slidably mounted on said central shaft assembly and remaining in driving engagement with said motor output shaft upon axial movement of said central shaft assembly by said manual override means.

23. An electric shift apparatus for use with a motor vehicle having an automatic transmission of the type having a mode select shaft to selectively shift the transmission between a plurality of shift positions, said apparatus comprising:
(A) a power module adapted to be mounted on the housing of the transmission proximate the mode select shaft and including an electric motor assembly having an output shaft adapted to be drivingly connected to the mode select shaft;
(B) a control module adapted to be mounted in the passenger compartment of the vehicle and including a plurality of mode select members accessible to the vehicle operator and corresponding respectively to the transmission shift positions, and generator means operative in response to operator actuation of each mode select member to generate an operator signal representative of the selected shift position;
(C) means operative in response to receipt of an operator signal to energize said motor assembly in a sense to move the mode select shaft to a position corresponding to the operator signal; and
(D) manual override means operative to move said output shaft and thereby the mode select shaft independently of energization of said motor.

* * * * *